June 5, 1956 F. G. CASTNER 2,749,401
OIL SAFETY MEASURING ROD
Filed July 27, 1953
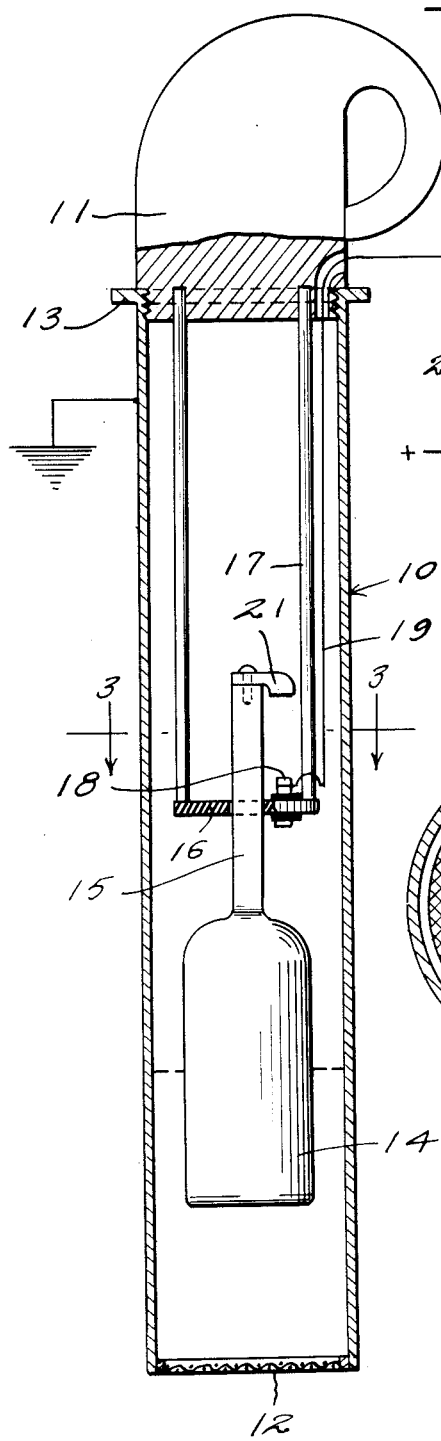
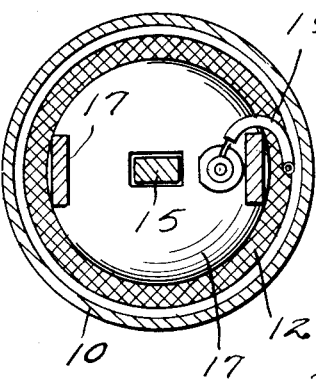
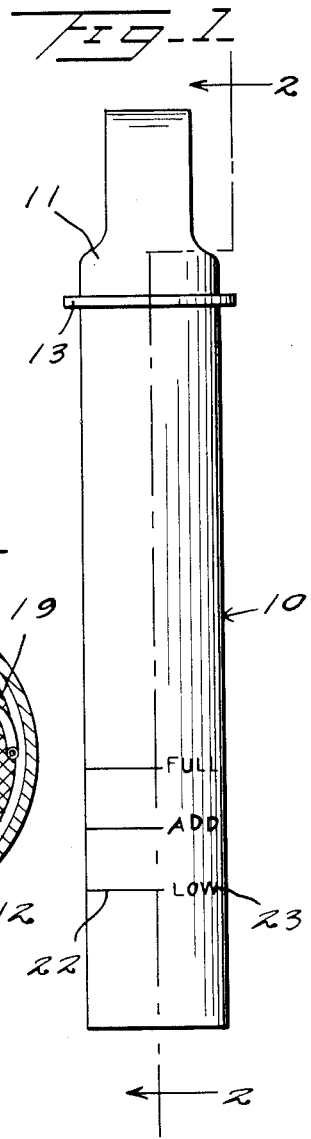
INVENTOR
F. G. Castner
BY Kimmel & Crowell
ATTORNEYS

United States Patent Office 2,749,401
Patented June 5, 1956

2,749,401

OIL SAFETY MEASURING ROD

Frank G. Castner, Bridgeport, Ohio, assignor to Tirips Corporation, Steubenville, Ohio, a corporation of Ohio Application July 27, 1953, Serial No. 370,348

2 Claims. (Cl. 200—84)

This invention relates to a safety means in combination with an oil measuring rod for internal combustion engines.

In internal combustion engines a measuring rod is provided so that the depth of oil in the crankcase may be measured. While these measuring rods are reasonably accurate they do not provide the necessary assurance that there is an adequate amount of oil in the crankcase for safe operation of the engine, particularly if the measuring rod is not examined each time that the fuel tank is filled. It is, therefore, an object of this invention to provide a means whereby the engine will be stopped in the event the oil level reaches a predetermined low.

Another object of this invention is to provide a float operated switch adapted to be connected to the ignition coil of the engine for grounding the coil and stopping the engine in the event the oil level reaches a predetermined low.

A further object of this invention is to provide a measuring rod of the kind which can be used with various types and kinds of internal combustion engines.

With the above and further objects in view, my invention consists in the arrangement, combination and details of construction, disclosed in the drawings and specification and then more particularly pointed out in the appended claims.

In the drawing:

Figure 1 is a detailed front elevation of a measuring rod constructed according to an embodiment of this invention.

Figure 2 is a sectional view taken on the line 2—2 of Figure 1.

Figure 3 is a sectional view taken on the line 3—3 of Figure 2.

Referring to the drawing, the numeral 10 designates an elongated tubular member which is adapted to be inserted in the opening provided in an internal combustion crank case for receiving an oil depth measuring rod. The tubular member 10 is provided with a flange 13 at its upper end and a head 11 is threaded or otherwise secured in the upper end of the tubular member 10.

A screen 12 is mounted in the lower end of the tubular member 10, so as to prevent any waste particles from entering the tubular member 10 from the lower end thereof.

In order to provide a means whereby the driver of the vehicle will be able to determine the depth of oil in the crank case particularly when the oil depth is at a dangerously low point, I have provided a float member 14 which is loosely disposed within the tubular member 10. The float member 14 has extending from the upper end thereof, a flat shank 15 which slidably engages through a guide plate 16 which is fixed to the lower end of a pair of depending bars 17. The bars 17 are fixed at their upper ends to the head member 11. A fixed switch contact member 18 is carried by and insulated from plate 16.

The fixed contact member 18 is connected by means of a conductor 19 to one side of the ignition coil 20 of the engine. The shank 15 has fixed to the upper end thereof, a contact 21 which in the normal operation of the engine is disposed in circuit breaking position above fixed contact 18. The outer side of the tubular member 10 may have graduations 22 impressed thereon, with legends 23 indicating the various oil levels in the crank case.

In the use and operation of this invention, the switch embodied by the contacts 18 and 21 is connected by conductor 19 to one side of the ignition coil of the engine. Contact member 21 with tubular member 10 is grounded to the engine so that when the oil level in the crank case drops to a predetermined low point, wherein contact 21 will engage contact 18, ignition coil 20 will thereupon be grounded so that the engine will stop. When the oil in the crank case has been replaced, float 14 will rise, thereby breaking the grounded circuit to coil 20 and permitting the coil 20 to function in the normal manner.

With a safety oil level indicating means as hereinbefore described, the engine will not be permitted to operate when the oil level is at a dangerously low point. In this manner, the operating parts of the engine will not be injured due to lack of lubrication.

What is claimed is:

1. A ullage rod of the type for measuring the oil depth in the crankcase of an internal combustion engine comprising an elongated tubular member adapted to be immersed in the oil to be measured, said member having indicia formed on the outer surface thereof to indicate the depth of the oil in which the member is immersed, a handle detachably secured to one end of said member, said member having the opposite end thereof open, an electric contact, means fixedly supporting said contact in said member above the open end thereof, a float, an elongated stem fixed to said float and projecting upwardly therefrom, means on said contact supporting means for supporting and guiding said stem for vertical reciprocation therein, and a movable contact carried by the upper end of said stem, said movable contact being engageable with said fixed contact upon movement of said float toward the open end of said member.

2. A device as claimed in claim 1 wherein said stem and said means for guiding said stem are formed with cooperating rectangular cross-sections whereby said stem is restrained from rotation with respect to said guide means.

References Cited in the file of this patent

UNITED STATES PATENTS

| | | |
|---|---|---|
| 1,132,791 | Pagano | Mar. 23, 1915 |
| 1,184,029 | Schatz et al. | May 23, 1916 |
| 1,243,470 | White | Oct. 16, 1917 |
| 1,307,189 | Downes et al. | June 17, 1919 |
| 1,401,383 | Williams | Dec. 27, 1921 |
| 1,496,306 | Duhamel | June 3, 1924 |
| 1,669,684 | Von Scheven | May 15, 1928 |